(12) United States Patent
Cavalier

(10) Patent No.: US 9,071,102 B2
(45) Date of Patent: Jun. 30, 2015

(54) PERMANENT MAGNET MACHINE HAVING ROTOR AND STATOR WITH MAGNETIC SURFACES OF ALTERNATING RIDGES AND VALLEYS

(71) Applicant: David Thomas Cavalier, Ona, FL (US)

(72) Inventor: David Thomas Cavalier, Ona, FL (US)

(*) Notice: Subject to any disclaimer, the term of this patent is extended or adjusted under 35 U.S.C. 154(b) by 289 days.

(21) Appl. No.: 13/686,823

(22) Filed: Nov. 27, 2012

(65) Prior Publication Data

US 2014/0145523 A1 May 29, 2014

(51) Int. Cl.
*H02K 1/27* (2006.01)
*H02K 53/00* (2006.01)

(52) U.S. Cl.
CPC . *H02K 1/27* (2013.01); *H02K 53/00* (2013.01)

(58) Field of Classification Search
CPC ........... H02K 1/17; H02K 1/182; H02K 1/27; H02K 1/2793; H02K 53/00
USPC .................. 310/268, 156.01, 156.32, 156.35, 310/156.41, 156.43, 156.46, 154.01, 310/154.21, 103, 90.5
See application file for complete search history.

(56) References Cited

U.S. PATENT DOCUMENTS

| 4,571,528 A * | 2/1986 | McGee et al. ........... 310/154.29 |
| 2012/0104890 A1* | 5/2012 | Burch et al. ............. 310/156.37 |

* cited by examiner

*Primary Examiner* — Michael Andrews

(57) ABSTRACT

The present invention is directed to the method of utilizing magnetic materials in permanent magnets and permanent magnet discs and surfaces, as a source of magnetic fields for producing rotational means, to produce a permanent magnet machine and utilizing this method to produce a powered means for use in remote pumping stations, geologic sensing stations both undersea and mountain top, remote electrical generating stations for inhabited areas of the planet off the power grid, power units for space stations, repair robots, planetary and lunar land rovers, astronomical research stations, electric generators, stabilization gyros and generators for autonomous robots, power units for motorized vehicles, and single person aircraft.

4 Claims, 5 Drawing Sheets

PERMANENT MAGNET MACHINE HAVING ROTOR AND STATOR WITH MAGNETIC SURFACES OF ALTERNATING RIDGES AND VALLEYS

BACKGROUND ART

A conventional electric motor using permanent magnets made from ferrous materials, most of which motors are AC and DC volt motors containing a stator core, an electrified coil, and a rotor.

DISCLOSURE OF INVENTION

It is the object of the current invention to provide a machine structure which is characterized by the use of rotor or rotor discs mounted on a shaft, and stator discs mounted on shaft housings and stator housing, where all discs share a common axis, and where the rotor disc is positioned between the stator discs, and spins with rotational means as the stators and rotor come closer together in proximity.

A permanent magnet machine comprising:
a rotor with a first plurality of permanent magnets placed on said rotor,
each of said first plurality of permanent magnets having a first magnet surface with alternating ridges and valleys originating near the center of said rotor and extending substantially radially toward the outer edge of said rotor, and a stator with a second plurality of permanent magnets placed on said stator, each of said second plurality of permanent magnets having a second magnet surface with alternating ridges and valleys originating near the center of said stator and extending radially toward the outer edge of said stator. A permanent magnet machine where triangle diamond shaped magnets are formed to make a magnetic stator plate or disc, and formed to make a magnetic rotor plate or disc and made with magnetically charged ferrous or rare earth element magnets or magnetic material that contribute to the formation of a disc having alternating ridges and valleys originating from
the center of the plate disc or surface and extending outward toward the edges of the plate disc or surface resembling a ridged spoke wheel and where in a permanent magnet machine where triangle diamond shaped magnets are formed to make a rotor surface and stator surface from magnetized material that contributes to the formation of a rotor surface and stator surface having alternating ridges and valleys originating near the center of the surface and extending toward the outward edge of the surface.

The stator plate disc surface can be manufactured and formed wholly and magnetized through the top surface, so that the top of the plate or disc surface is negatively charged and the bottom of said plate or disc surface is positively charged, or vice versa, depending on the application. A nonferrous rotor spoked frame for a magnetic air gap machine comprised of at least one rigid rotor frame having a multiple of apertures, each of said apertures adapted to receive a polarized permanent magnet, contributing to the formation of a rotor plate or disc, and a nonferrous stator spoked frame for the magnetic air gap machine comprised of at least one rigid stator frame having a multiple of apertures, each of said apertures adapted to receive a polarized permanent magnet, contributing to the formation of the stator plate or disc.

The spoked rotor frame made from aluminum or other nonferrous metal, or other rigid material such as resin or ceramic that retain structural integrity, where triangle diamond shaped magnets are embedded or molded into the spoked frame, that is molded or coupled to a rotor hub which is coupled or keyed to a rotor shaft and where the molded rotor outer ring can be weighted to add inertial momentum adding gyroscopic characteristics.

Rotor plate or disc can be fitted with rigid material at its center so that it can be coupled to a shaft, or a center hub can be cast in place to a shaft using resin or other materials that retain structural integrity of the permanent magnets on the disc or plate.

Stator plate or disc if not formed as one piece can be fitted with nonferrous rigid material at its center so that it can be coupled to a shaft housing or it can be cast in place on a shaft housing using resin or other materials to retain structural integrity of the permanent magnets on the disc or plate surface.

A permanent magnet machine comprising a magnetized rotor disc containing permanent magnets that contribute to the formation of the rotor disc whose magnetic surface has alternating ridges and valleys originating from or near the center of the rotor disc and extending toward the outward edge of the rotor disc, and comprising a magnetized stator or stators containing magnets that contribute to the formation of the stator whose magnetic surface has alternating ridges and valleys originating from or near the center of the disc and extending toward the outward edge of the disc, or rotor disc and or stator discs or stator surfaces formed from magnetized material contributing to the formation of a rotor disc or stator disc or surface, having alternating ridges and valleys originating from or near the center of the disc or surface and extending toward the outward edge of the disc or surface, and where rotor and or stator ridged surfaces are offset in relation to one another, where all rotor and stators share a common center axis at their center.

Rotor and stator plates or discs can be stacked depending on the application as multiple discs can be used to make stronger machines motors using an almost limitless amount of discs where all discs can be offset in relation to one another to avoid exact matching of surface ridges and where the rotor disc interacts magnetically with the surfaces of the fixed stator discs or stator surfaces, creating rotational energy in the rotor and when the magnetic stator discs are not fixed, then all stator and rotor plates or discs would be counter rotating, essentially making all discs rotors for tilling or blending applications or when counter rotational operation is utilized.

In FIG. 1 Rotor disc 2 is made to be free spinning, where stator discs 1 and 3 can be free spinning or constrained from spinning but made where stator discs 1 and 3 can slide towards or away from rotor disc 2 along a rotor shaft 4 and where the magnetized stators and magnetized rotor sharing a common axis are staggered in relation to one another to avoid exact matching and where the rotor or stator magnets can be affixed or formed in an off centric fashion on the rotor or stator, contributing to a surface having alternating ridges and valleys originating from or near a the center of the disc or surface and extending toward the outward edge of the disc or surface, where the magnets can be varied by count or angle on the disc or stator surface, and where the magnet ridges on the rotor and stator surface can be chamfered and where said magnets form a magnetized disc or surface having alternating ridges and valleys, originating near the center of the disc and extending toward the outward edge of the disc or surface where all rotor and stator surfaces are parallel to one another and share a common center axis.

In FIG. 1 An unframed rotor disc assembly 2 containing triangle diamond shaped magnets 11 contributing to the formation of a disc where said magnets are magnetically charged and embedded or placed on the rotor where a side edge of one placed magnet is negatively charged and the other side edge of said magnet is positively charged and placed next to another magnet on the rotor disc whose adjacent side edge is negatively charged and where the other side edge of said magnet is positively charged and placed next to another magnet whose adjacent side edge is negatively charged and where the other side edge of said magnet is positively charged and where this magnetic pattern placement of magnets continues around the disc consecutively, contributing to the formation of a complete disc and where said magnets form a magnetized disc surface having alternating ridges and valleys, originating near the center of the disc and extending toward the outward edge of the disc and where said disc is affixed to a rotor hub 7, that is coupled to a rotor shaft 4 and where the triangle diamond shaped magnets are utilized to form a rotor disc where these magnets are affixed or embedded on the frame to make a disc, contributing to the disc surface having alternating magnetic ridges and valleys originating near the center of the disc surface and extending toward the outward edge of the disc surface, where all rotor and stators share a common center axis. In FIG. 1 Where stator 1 and stator 3 are positioned on both sides of rotor 2 and where all discs or magnetized surfaces are parallel to one another contributing to a permanent magnet machine comprising at least one rotor disc, where embedded or affixed permanent magnets on the rotor disc contribute to the formation of the disc having alternating ridges and valleys originating near the center of the disc and extending toward the outward edge of the disc, and where said magnets are magnetically charged so that the leading edge of the rotor magnets while spinning or at rest is positively charged and the trailing edge of said rotor magnets are negatively charged or vice versa depending on the application and where the rotor disc is positioned between at least two stator discs or stator surfaces containing or made of magnetic material contributing to the formation of a disc or surface having alternating ridges and valleys that originate near the center of the disc or surface and extend toward the outward edge of the stator disc or surface, where one ridge surfaced side of the stator disc or surface is negatively charged and the opposite side of said stator disc or surface is positively charged or vice versa depending on the application, where all rotor and stators share a common center axis.

In FIG. 2 stator discs 1 and 3 are on both sides of rotor disc 2 and where stator discs 1 and 3 are made to slide toward rotor disc 2 which is coupled to rotor shaft 4 in this operating position and where stator discs 1 and 3 are constrained from spinning but in this operating side view are moved towards rotor disc 2 along the rotor shaft 4 where rotor disc 2 would spin following the principle of magnetism where like poles repulse one another while opposite poles attract one another, where all discs share a common center axis.

DESCRIPTION

The detailed embodiments of the invention will be described with reference to the accompanying 5 drawings as follows.

FIG. 1

Figure 1:
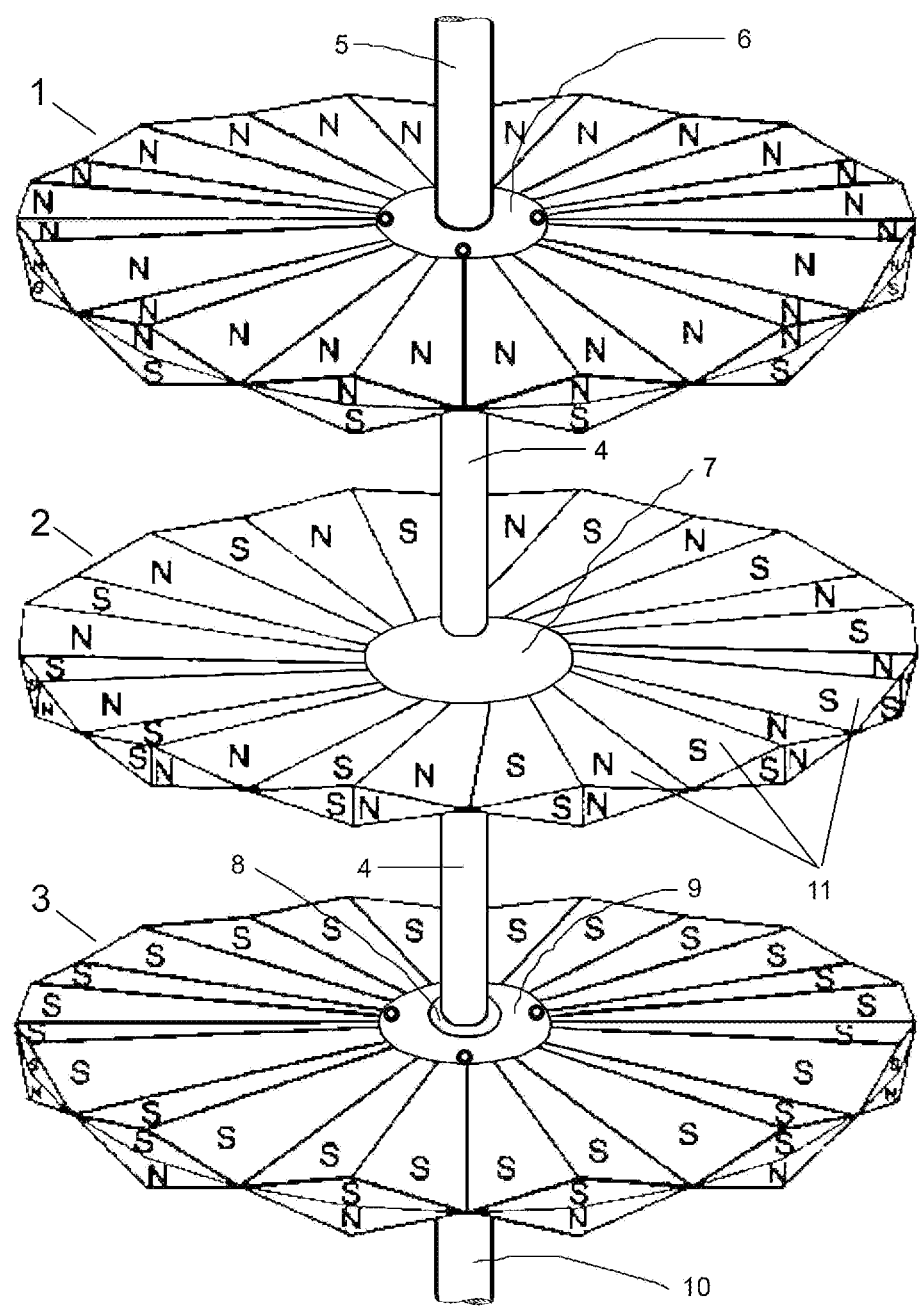
FIG. 1 a perspective view illustrating a three disc permanent magnet machine assembly with a center axis shaft according to the invention.

FIG. 1 A perspective view illustrating a three disc motor where stator disc 1 and rotor disc 2 and stator disc 3 are centered on an axis, parallel to one another.

Stator disc 1 comprised of formed magnetic material where one side of the disc face is negatively charged and the other side of the disc face is positively charged, and form a magnetized disc surface having alternating ridges and valleys, originating near the center of the disc and extending toward the outward edge of the disc that is coupled to stator flange bearing 6 which is coupled to a shaft housing 5 where the center of the flange bearing is occupied by a rotor shaft 4.

An unframed rotor disc 2 assembly containing triangle diamond shaped magnets 11 that are magnetically charged where the negative side of one magnet is adjacent to the positive side of the next magnet and where this magnet pattern then continues around the disc, and where said magnets contribute to a completed magnetized disc having alternating ridges and valleys, originating near the center of the disc and extending toward the outward edge of the disc where said magnets are affixed to a rotor hub 7, that is coupled to the rotor shaft 4.

Stator disc 3 comprised of formed magnetic material where one side of the disc face is positively charged and the other side of the disc face is negatively charged, and form a magnetized disc surface having alternating ridges and valleys, originating near the center of the disc and extending toward the outward edge of the disc, that is coupled to stator flange bearing 9 which is coupled to a shaft housing 10 where the center of the flange bearing 8 is occupied by the rotor shaft 4.

FIG. 2

Figure 2:
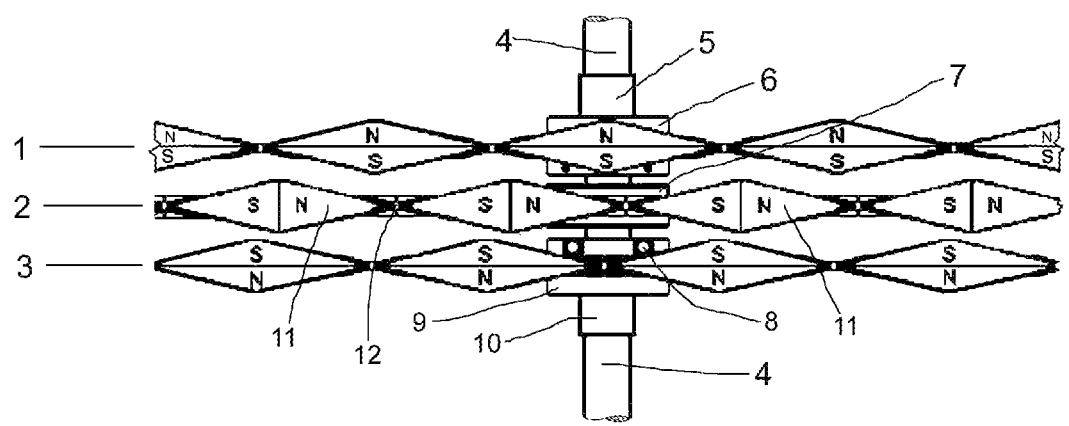
FIG. 2 a side view illustrating a three disc permanent magnet machine assembly with a center axis shaft according to the invention.

FIG. 2 A side view illustrating a three disc motor where stator disc 1 and rotor disc 2 and stator disc 3 are centered on an axis, parallel to one another.

Where stator disc 1 comprised of formed magnetic material where one side of the disc face is charged negatively and the other side of the disc face is charged positively, coupled to stator flange bearing 6 which is coupled to a shaft housing 5 where the center of the flange bearing 6 is occupied by a rotor shaft 4.

Rotor disc 2 Assembly which consists of a spoked frame 12 containing embedded magnets 11, which is affixed to a rotor hub 7 that is coupled to a rotor shaft 4.

Where stator disc 3 comprised of formed magnetic material where one side of the disc face is charged negatively and the other side of the disc face is charged positively, coupled to stator flange bearing 9 which is coupled to a shaft housing 10 where the center of the bearing 8 is occupied by a rotor shaft 4.

FIG. 3

Figure 3:
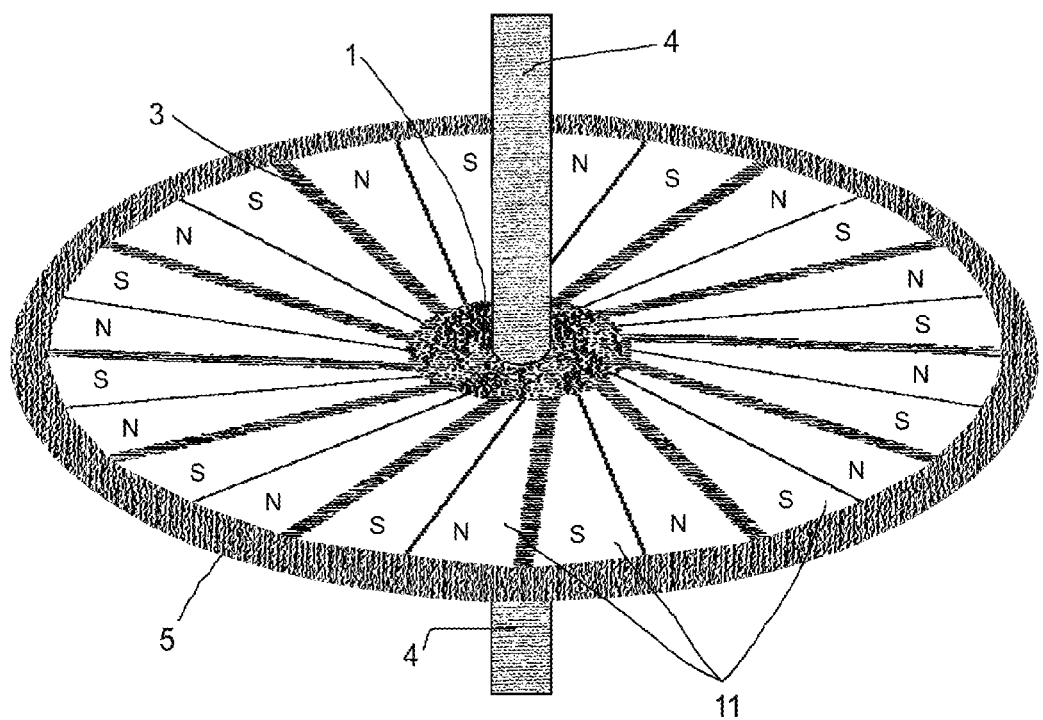
FIG. 3 a perspective view illustrating a spoked nonferrous rotor frame containing embedded magnets with a center axis shaft according to the invention.

FIG. 3 A perspective view illustrating a spoked rotor frame disc assembly where triangle diamond shaped magnets 11 are embedded or molded into the spoked frame 3 that is molded or coupled to rotor hub 1 which is coupled to rotor shaft 4 and where the molded rotor outer ring 5 is weighted to add inertial momentum contributing to gyroscopic characteristics in the permanent magnet motor.

In this view the spoked resin frame 3 includes rotor hub 1 and rotor ring 5 where they are molded as one piece around a shaft 4.

FIG. 4

Figure 4:
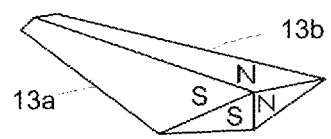
FIG. 4 a perspective view illustrating single rotor or stator polarized triangle diamond shaped magnets according to the invention.
Figure 4:
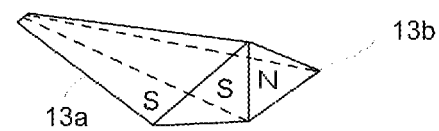
Figure 4:
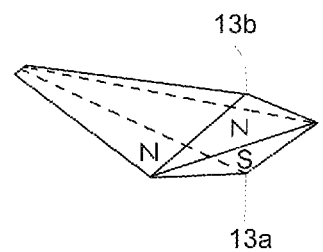

FIG. 4 A perspective view illustrating polarized triangle diamond shaped magnets that are utilized and contained in the rotors and stators of a permanent magnet machine, where one edge of a face of the magnet is the south pole 13a and the other corresponding opposite edge of a face of the magnet 13b is the north pole.

FIG. 5

Figure 5:
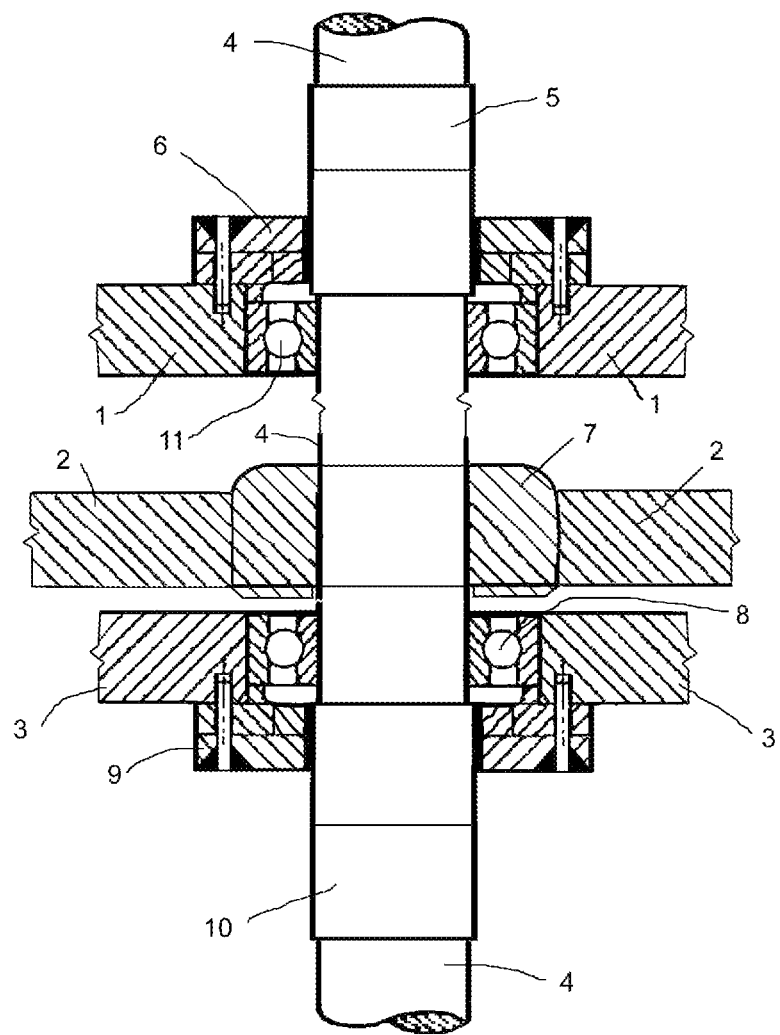
FIG. 5 a cross sectional side view of a three disc permanent magnet machine center axis shaft assembly according to the invention.

FIG. 5 A cross sectional side view of a three disc machine and shaft assembly.

Where stator disc 1 is coupled to stator flange bearing assembly 6 which is coupled to a shaft housing 5 where the center of the bearing 11 is occupied by rotor shaft 4 where all rotor and stators share a common center axis.

Rotor disc 2 assembly is affixed to a rotor hub 7 that is coupled to the rotor shaft 4.

Where stator disc 3 is coupled to stator flange bearing assembly 9 which is coupled to a shaft housing 10 where the center of the bearing 8 is occupied by rotor shaft 4 where all rotor and stators share a common center axis.

What is claimed:

1. A permanent magnet machine comprising: a rotor with a first plurality of permanent magnets placed on said rotor each of said first plurality of permanent magnets having a first magnet surface with alternating ridges and valleys originating near the center of said rotor and extending substantially radially toward the outer edge of said rotor, and a stator with a second plurality of permanent magnets placed on said stator, each of said second plurality of permanent magnets having a second magnet surface with alternating ridges and valleys originating near the center of said stator and extending radially toward the outer edge of said stator, wherein said rotor and said stator share a common axis of rotation where in said rotor first magnet surfaces are formed from magnetized material, and wherein said second magnet surfaces are formed from magnetized material.

2. A permanent magnet machine according to claim 1, wherein said first plurality of permanent magnets comprises triangle diamond shaped magnets, wherein said first plurality of permanent magnets are affixed, embedded or formed to make a rotor disc, and each of said first plurality of permanent magnets contributes to a rotor disc surface having alternating magnetic ridges and valleys originating near the center of said rotor disc surface and extending substantially radially toward the outer edge of said rotor disc surface, and wherein said second plurality of permanent magnets comprises triangle diamond shaped magnets, wherein said second plurality of permanent magnets are affixed, embedded or formed to make a stator disc, and each of said second plurality of permanent magnets contributes to a stator disc surface having alternating magnetic ridges and valleys originating near the center of said stator disc surface and extending radially toward the outer edge of said stator disc surface.

3. A permanent magnet machine comprising: at least one rotor having a first plurality of triangle diamond shaped magnets embedded or affixed on said rotor, said first plurality of triangle diamond shaped magnets forming a rotor disc, each of said first plurality of triangle diamond shaped magnets having alternating ridges and valleys originating near the center of said rotor disc and extending substantially radially toward the outer edge of said rotor disc, wherein one radial edge of each of said first plurality of triangle diamond shaped magnets is negatively charged and the other radial edge of each of said first plurality of triangle diamond shaped magnets is positively charged, wherein each of said first plurality of triangle diamond shaped magnets is placed circumferentially adjacent to another of said first plurality of triangle diamond shaped magnets on said rotor disc, wherein all magnets of said first plurality of triangle diamond shaped magnets have the same polarity, wherein a straight line between the ridges of each of said first plurality of triangle diamond shaped magnets divides the negative and positive poles of that magnet, and wherein said rotor disc is positioned axially between at least two stators, each of said at least two stators containing a second plurality of triangle diamond shaped magnets, said second plurality of triangle diamond shaped magnets forming a stator disc, each of said second plurality of triangle diamond shaped magnets having alternating ridges and valleys originating near the center of said stator disc and extending radially toward the outer edge of said stator disc, wherein one side of each of said second plurality of triangle diamond shaped magnets, containing one of said ridges and axially facing said rotor disc, is negatively charged and the opposite side of each of said second plurality of triangle diamond shaped magnets is positively charged, wherein said at least one rotor and said at least two stators share a common center axis, wherein said rotor disc is coupled to a rotor shaft, and each of said stator discs is coupled to a stator housing that includes a bearing whose center is occupied by said rotor shaft.

4. The permanent magnet machine according to claim 2 further comprising a non ferrous rotor spoked frame having multiple apertures, each of said aperture adapted to receive first plurality of said triangle diamond shaped magnets, and a non ferrous stator spoked frame having multiple apertures, each of said aperture adapted to receive second plurality of said triangle diamond shaped magnets, wherein all rotor magnets are extending substantially radially toward the outer edge of said rotor, and varied by count or angle to avoid exact matching of magnetic fields and wherein said machine is placed in a stator housing.

\* \* \* \* \*